United States Patent
Kodaypak et al.

(10) Patent No.: US 11,382,025 B2
(45) Date of Patent: Jul. 5, 2022

(54) OBJECT-RESOURCE MODEL TO FACILITATE IOT SERVICES

(71) Applicants: AT&T Intellectual Property I, L.P., Atlanta, GA (US); AT&T Mobility II LLC, Atlanta, GA (US)

(72) Inventors: Rajendra Prasad Kodaypak, Sammamish, WA (US); Gaurav Gupta, Sammamish, WA (US); Bahman Khamneian, Kirkland, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 35 days.

(21) Appl. No.: 16/285,559

(22) Filed: Feb. 26, 2019

(65) Prior Publication Data
US 2020/0275350 A1   Aug. 27, 2020

(51) Int. Cl.
| H04W 8/08 | (2009.01) |
| H04W 48/14 | (2009.01) |
| H04W 88/02 | (2009.01) |
| H04W 48/16 | (2009.01) |

(52) U.S. Cl.
CPC ............ *H04W 48/14* (2013.01); *H04W 8/08* (2013.01); *H04W 48/16* (2013.01); *H04W 88/023* (2013.01)

(58) Field of Classification Search
CPC combination set(s) only.
See application file for complete search history.

(56) References Cited

U.S. PATENT DOCUMENTS

| 8,700,002 B2 | 4/2014 | Lopez et al. | |
| 8,929,865 B2 | 1/2015 | Lopez et al. | |
| 2009/0270120 A1* | 10/2009 | Park | H04W 72/005 455/518 |
| 2016/0255522 A1* | 9/2016 | Emanuelsson | H04W 28/0252 370/252 |
| 2017/0235585 A1 | 8/2017 | Gupta et al. | |
| 2018/0054799 A1* | 2/2018 | Starsinic | H04W 52/0219 |
| 2018/0091506 A1* | 3/2018 | Chow | G06Q 20/085 |
| 2018/0109941 A1 | 4/2018 | Jain et al. | |
| 2018/0199160 A1* | 7/2018 | Edge | H04W 4/02 |
| 2018/0206093 A1 | 7/2018 | Jain et al. | |
| 2018/0279115 A1 | 9/2018 | Tanna | |
| 2018/0324671 A1 | 11/2018 | Palnati et al. | |
| 2018/0332462 A1 | 11/2018 | Kim et al. | |

(Continued)

FOREIGN PATENT DOCUMENTS

WO   2017202305 A1   11/2017

*Primary Examiner* — Mansour Oveissi
(74) *Attorney, Agent, or Firm* — Amin, Turocy & Watson, LLP

(57) ABSTRACT

A network device can receive a request from an application server for availability information associated with a response period in which a user equipment is responsive to communications. The network device can send a status query related to the user equipment to a radio access network controller device that processes signals between the user equipment and a mobile network core device. The network device can receive the availability information from the radio access network controller device and transmit a notification message to the application server that indicates the response period.

20 Claims, 13 Drawing Sheets

(56) References Cited

U.S. PATENT DOCUMENTS

2018/0332636 A1    11/2018  Lu et al.
2018/0368202 A1*   12/2018  Landais ................ H04W 76/28
2020/0037345 A1*    1/2020  Ryoo ................... H04W 76/10

* cited by examiner

OBJECT-RESOURCE MODEL TO FACILITATE IOT SERVICES

TECHNICAL FIELD

The present application relates generally to the field of wireless communication and, more specifically, to IoT services and obtaining information from IoT devices.

BACKGROUND

Cellular communications technology, including radio access technology, has grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Additionally, fifth generation (5G) access networks, which can also be referred to as New Radio (NR) access networks.

With continued developments around 4G (e.g., LTE) networks and the advent of 5G networks, mobile networking infrastructure is expected to facilitate fulfillment of the demand for exponentially increasing data traffic, and to handle a very wide range of use cases and requirements, including among others, mobile broadband (MBB) services, enhanced mobile broadband (eMBB) services, "vehicle-to-everything" (V2X) communications, and machine type communications (such as Internet of Things (IoT) devices).

The industrial internet of things (IIoT), a term used to describe all the various sets of hardware components that work together through IoT connectivity to help enhance various industries (e.g., manufacturing, industrial processes, etc.), has become increasingly pervasive in the age of digital transformation. The Industrial Internet brings together a variety of devices, machines, networks and people. By connecting a multitude of devices with high-speed mobile communications and networking technologies, intelligent networks and systems can be developed that can monitor, gather, analyze, and deliver data that could not be possible before. Such data in turn can help drive smarter business decisions for many companies that haven't experienced this before.

As wireless technologies continue to evolve, telecommunications companies and carriers will continue to collaborate and drive new partnerships with IoT service providers to be able to connect millions of next-generation devices with complex IP mobility networks. With established practices in high-speed mobile connectivity evolution, life cycle management, trusted relationships, integration of powerful platforms and partners to create and manage new services, mobile operators are in a vantage position to tether the global IoT industry.

Mobility network functions traditionally have been built on legacy platforms that have given carriers a competitive edge in building their networks with scale, quality and time to market when launching commercial services. With the advent of open networking standards, network function virtualization (NFV), software defined networking (SDN), and edge computing principles, mobile networks will undergo significant transformation, and carriers need to rethink their mobility architecture designs as well as new services, billing models, and pricing models to innovate and stay ahead in the industry.

Although such proven legacy platforms have worked successfully in the commercial launch of large-scale global LTE deployments over the past decade, they may not be ideally suitable for massive IoT connections and resulting hybrid mobility services that have disparate requirements across a broader set of industry verticals. The next generation of commercial and industrial IoT mobility services in an open-standards-driven high-speed wireless networking environment will likely have stringent demands with respect to overall functionality, quality, reliability, availability, in addition to cost-sensitivity.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
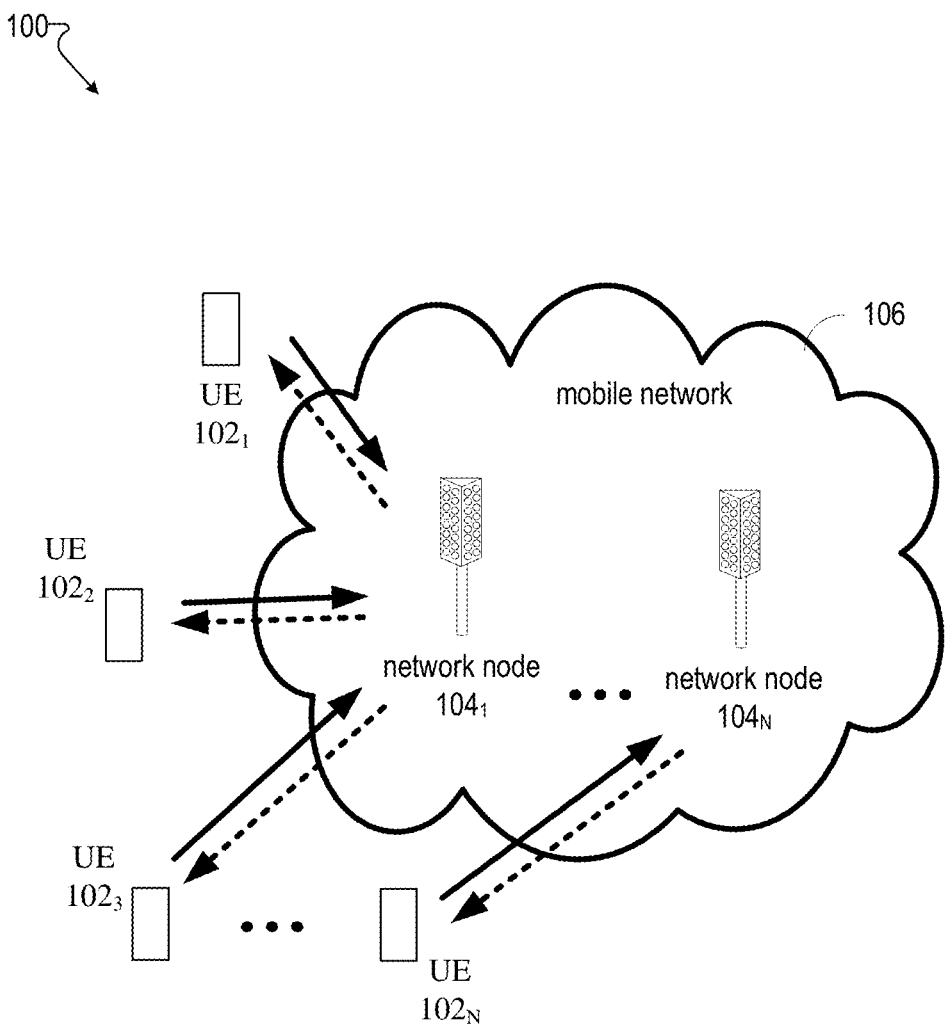
FIG. 1 illustrates an example wireless communication system having a network node device (also referred to herein as a network node) and user equipment (UE), in accordance with various aspects and example embodiments of the subject application.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., network management device, gateway device, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 12 and FIG. 13.

LTE technology has been a great success in the cellular connectivity world and has driven widespread adoption of smart phones that changed the way people communicate today. While several new categories of high-performance devices have emerged based on standards research and are being used to trial very high-speed mobile broadband solutions, the IIoT segment is witnessing adoptions of new categories of devices as well. IoT devices fall into specific categories as they have unique capabilities such as power savings mode (PSM), extended idle mode DRX (eDRX), coverage extension (CE), EPS optimizations etc. that maximize their shelf life. These IoT devices can be served by a common LTE network infrastructure with legacy management mobility entities (MMEs) supporting 3GPP standards defined feature capabilities. The mobility management entity (MME) function in 4G/LTE (and access and mobility management function (AMF) in 5G) are the components of network infrastructure that routes the control plane signaling traffic and performs several important functions. With more than a dozen standards-defined signaling interfaces and unique application protocols, it lays the foundation for strong interworking with its peers to deliver a variety of commercial and regulatory mobility services. Traditional methods for MME implementation involved logical partitioning of standards defined sub-system functions that have been built with custom hardware (HW) and software (SW).

However, as the IoT device volumes increase, the core network interworking options may not suffice, and thus new features, architectures, as well as resource sharing models need to be evaluated in accordance with the required use cases. While a single MME (or AMF in 5G) could serve millions of smartphone users using legacy design, the incremental handling of a large volume of IoT device categories with unique characteristics can add to the traffic modeling dynamics, configuration, connectivity, signaling routing complexity, database congestion due to massive devices context handling, capacity, scalability, and overall MME platform reliability.

IoT service providers that require access to their installed device base and associated contextual intelligence may need to contact the MME network function via efficient control plane signaling. While 3GPP Rel.13 standards introduced a dedicated Service Capability Exposure Function (SCEF) platform and function to expose specific control plane functions such as the MME, with new interfaces T6a & S6t, this function adds significant complexity to the mobility core in that it adds incremental signaling between network functions, as well as network development and deployment costs. The SCEF interfaces with multiple external server domains via application programming interfaces (APIs, a software intermediary that allows two applications to talk to each other) that disrupt the legacy network design dynamics and add significant operations complexity/cost.

The present application relates a network device that executes software (collectively referred to as the Context Intelligence Exposure Server CIES)) that enables the network device to interface with MMEs and also interface with an IoT application server, so that the IoT application server can access information that allows it to communicate with the IoT devices (e.g., provide IoT services) more efficiently.

FIG. 1 illustrates some example components of a typical wireless communication system 100 (also referred to as wireless system 100, mobile system 100, mobile communications system 100). In example embodiments (also referred to as non-limiting embodiments), wireless communications system 100 can comprise a mobile (also referred to as cellular) network 106, which can comprise one or more mobile networks typically operated by communication service providers. The wireless communication system 100 can also comprise one or more user equipment (UE) $102_{1-N}$ (also referred to as UE 102). UE $102_{1-N}$ can communicate with one another via one or more network node devices (also referred to as network nodes) $104_{1-N}$ (referred to as network node 104 in the singular) of the mobile network 106. The dashed arrow lines from the network nodes $104_{1-N}$ to the UE $102_{1-N}$ represent downlink (DL) communications and the solid arrow lines from the UE $102_{1-N}$ to the network nodes $104_{1-N}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, a cellular vehicle to everything device (C-V2X device), and the like. In the context of the present application, the UE 102 can also comprise IOT devices that communicate wirelessly with, for example, an application server.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile device), and the like. For example, in at least one implementation, wireless communications system 100 can be or can include a large-scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosure, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB (gNB) device, which provides NR user plane and control plane protocol terminations towards the UE, and connects to the 5G core.

Figure 2:
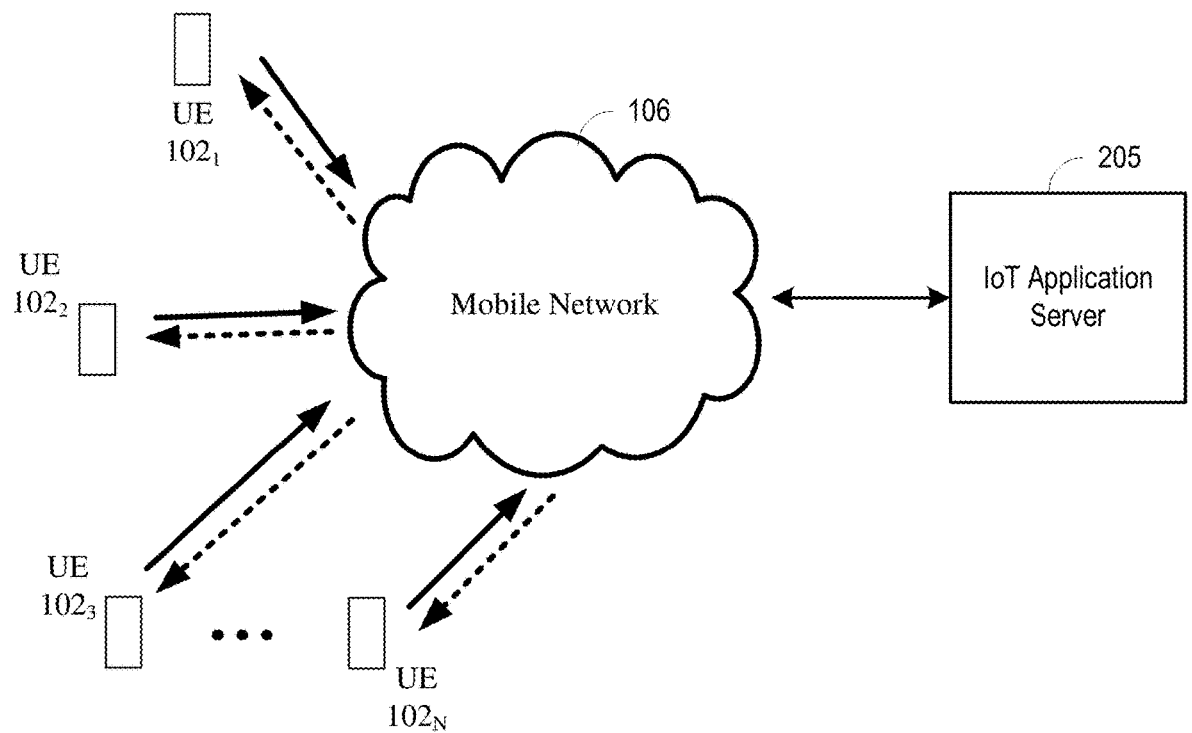
FIG. 2 illustrates an example of an IoT application server 205 that communications with various UEs, in accordance with various aspects and example embodiments of the subject application.

FIG. 2 depicts an IoT application server 205 communicating through a mobile network (mobile network 106) with IoT devices (e.g., UEs $102_{1-N}$). Many of the IoT devices (sensors in light bulbs, appliances, etc.) that will be deployed, including in IIoT environments, will not always be in an "active" state in which they can respond to communications. Such IoT devices can be designed to operate on stored energy (e.g., battery), or can be designed to draw very low amounts of power from the electric utility grid on a periodic basis. An example might be a turnstile at the entrance to a subway station, which records the number of people passing through the turnstile. The turnstile might have an IoT device embedded within it that is programmed turn on (e.g., go from an idle to an active state) and to report its count by responding to any inquiring servers when it is in an active state. An IoT application server that is associated with the turnstile might be the inquiring server. When the IoT application server seeks information from the turnstile IoT device, the IoT application can sent a transmission to the turnstile IoT device to determine if it is active ("ping" the turnstile IoT device to see if it responds with an acknowledgement that it is active). When the turnstile IoT device reaches an active state, the turnstile IoT device will acknowledge in the affirmative, and then the IoT application server can send a request for the turnstile's count, the turnstile IoT device will respond accordingly, by transmitting its count. However, as the number of IoT devices increase, the number of times that the IoT application servers will "ping" these devices will also increase. Especially if the IoT application servers do not know when the IoT devices are in an active state capable of responding to messages and sending back responses, the number of periodic pings being transmitted to the IoT devices, and the quickly increasing number of such devices, can be frequent enough and voluminous enough to put a significant strain on a mobile network's resources, especially on MMEs (and in 5G, AMFs), which would be serving millions of such devices. The present application can alleviate some of these strains on the network from these IoT application servers communicating with IoT devices.

Figure 3:
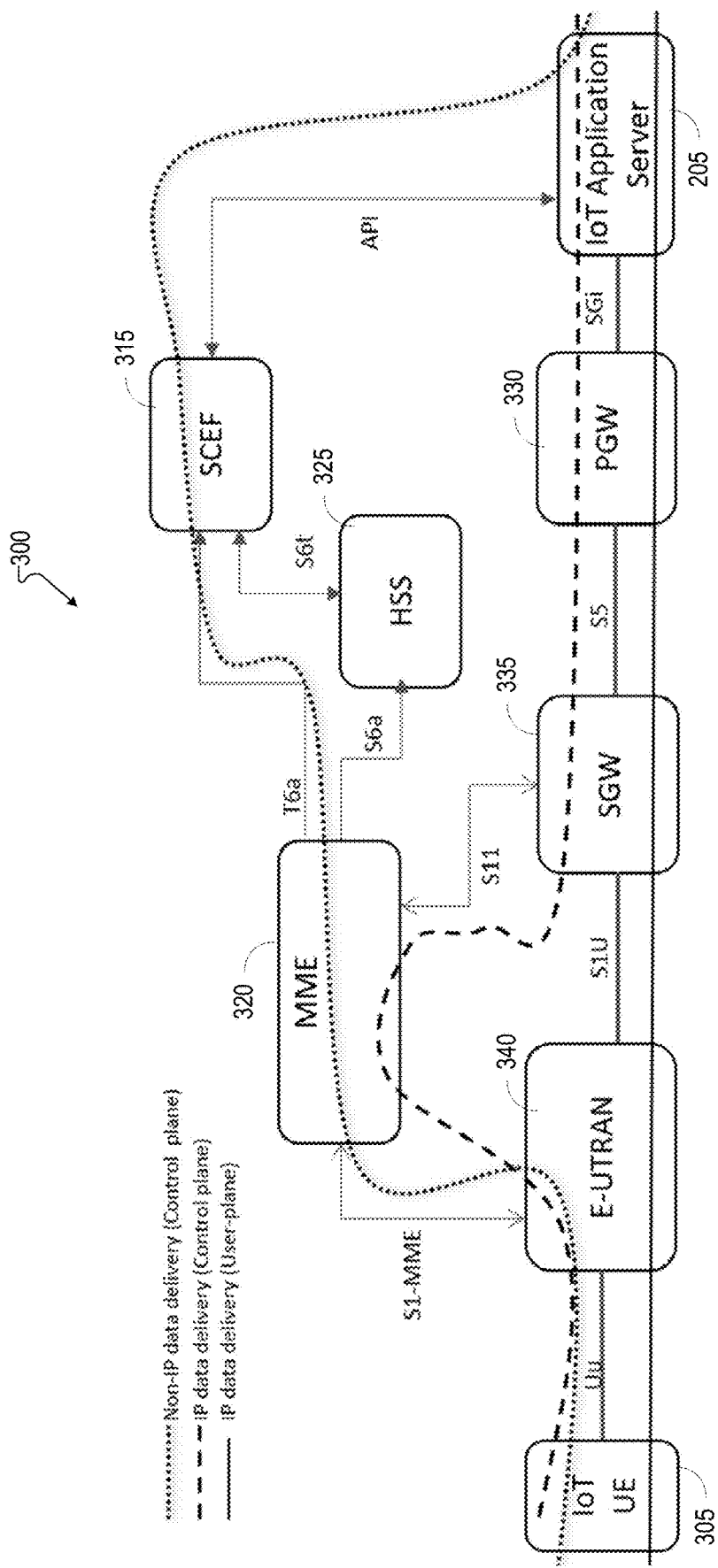
FIG. 3 illustrates an example of a low power wide area (LPWA) architecture for IoT services, in accordance with various aspects and example embodiments of the subject application.

FIG. 3 depicts an example illustration of example components (e.g., one or more devices executing software to perform functions) of a low power wide area (LPWA) architecture for IoT services, which can be part of the mobile network 106. LPWA, unlike LTE, is available to non-mobile network operators (MNOs) because it can operate over unlicensed, spectrum, including the less-than-1 gigahertz (GHz) industrial, science, and medical (ISM) bands, and TV white-spaces. LPWA provides the capability to connect large quantities of devices and provides for battery efficient wide-area connectivity managed by the wireless provider.

In example embodiments, the LPWA network 300 can comprise a UE 102 that is an IoT UE, designated herein as IoT UE 305. The system can also comprise an IoT application server 205, which communicates with the IoT UE 305 through other components of LPWA network 300. Control and User Plane data transfers are used to deliver IoT services in an LTE mobility network. Service Capability Exposure Function (SCEF) (SCEF 315) is a new, standards-based network element (introduced in in release 13 of the 3GPP standards). Mobility core network components such as MME (MME 320), home subscriber system (HSS) (HSS 325), packet data network gateway (PGW) (PGW 330), serving gateway (SGW) (SGW 335), Evolved Universal Mobile Telecommunications System (UMTS) Terrestrial Radio Access (E-UTRAN) (E-UTRAN 340, which can include network node 104), and SCEF (SCEF 315), and their respective interfaces (e.g., SGi, S5, S1U, Uu, API, S6t, S6a, S1-MME, S11), can comprise legacy (physical), virtualized, and/or in hybrid configurations. These devices and functions can be centralized or distributed based on operator's deployment model for IoT mobility services delivery. A subset of these functions can be co-located closer to the RAN clusters where appropriate to reduce potential latency aspects of targeted services in a given serving area. Platforms impacted to expose IoT services externally are: SCEF (massive xapital expenditure (CapEx)/operation expenditure (OpEx)), HSS, MME, dynamic resource allocation (DRA).

Figure 4:
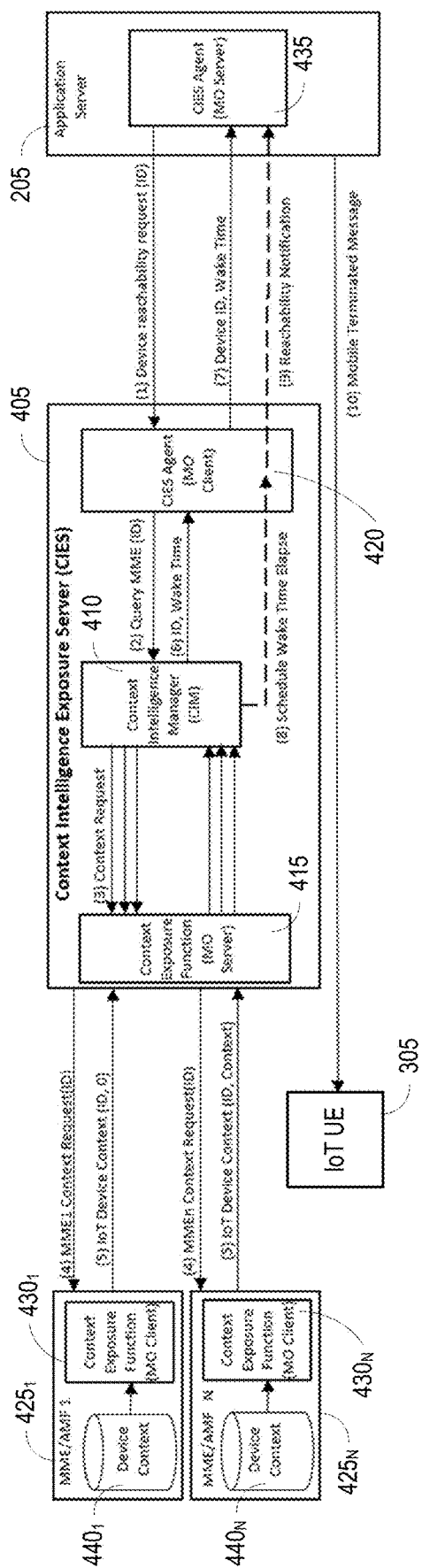
FIG. 4 illustrates transactional diagram involving interactions between a Context Intelligence Exposure Server (CIES) and radio access network (RAN) controller devices and IoT application servers, in accordance with various aspects and example embodiments of the subject application.

FIG. 4 depicts an illustration of example embodiments of the present application relating to the management of IoT communications. Example embodiments of the present application relate to several functions, which can be implemented by one or more devices, in locations throughout the network (e.g., using network function virtualization (NFV), software defined networking (SDN), and edge computing principles), and interworking of network devices implementing these functions.

In example embodiments, a Context Intelligence Exposure Server (CIES) (CIES 405) comprises rules-driven logic to partition and rearrange the parsed object-resource model (ORM) data. The CIES 405 can comprise several other modules (implemented as one or more computing devices executing software modules that perform functions). These modules can comprise a Context Intelligence Manager (CIM) 410, a CIES Context Exposure Function Managed Object (MO) Server 415, and a CIES Agent Managed Object Client 420.

The Context Intelligence Manager (CIM) (CIM 410) resides within the CIES 405 and operates in a client-server model. It can process classified object ORM data received from the CIES CEF MO Server 415.

The CIES CEF MO Server 415 can interact with radio access network controllers (RAN Controller $425_{1-N}$). The RAN Controller in LTE is termed MME, and in 5G terminology, it is termed AMF. In example embodiments of the present application, each RAN Controller 425 can comprise a managed object (MO) client, referred to as RAN Controller Context Exposure Function MO Client (RAN Controller CEF MO Client 430, and in the plural as RAN Controller CEF MO Clients $430_{1-N}$). The RAN Controller CEF MO Client 430 will be described further below.

The CIES 405 also comprises a CIES Agent MO client (CIES Agent MO Client 420) that facilitates interactions with external application server(s) (which can be an IoT application server 205) that could be hosted in a public or private cloud environment. The CIES also supports additional timing logic that could be utilized with specific triggers from CIM 410 to send "wake up" notifications (explained below) to the IoT application server 205.

Still referring to FIG. 4, The CIM interworks with the RAN Controllers $420_{1-N}$ via the CIES CEF MO Server 415, and with IoT application server 205, via the CIES Agent MO Client 420.

The Ran Controller CEF MO Client 430 can reside in each of the MMEs within a pool region and, as mentioned above, can communicates with the CIES CEF MO server 415 within the CIES 405. In example embodiments, it can run over a constrained application protocol and Datagram Transport Layer Security (DTLS)/User Datagram Protocol (UDP) can be used for secure transport of contextual data exchange between the MME/AMF and CIES. The RAN Controller CEF MO Client 430, using an IoT object-resource model (ORM) in conjunction with intelligent grouping of the international mobile subscriber identity (IMSI)/IMSI-range series/device category/priority attributes, can interconnect, via the CIES 405, with IoT application server 205. The RAN Controller CEF MO Client 430 can communicate via standardized APIs, using a secure transport layer, to authorized external IoT application servers (e.g., IoT application server 205), and more specifically, with IoT application server comprising an IoT application server CIES Agent MO Server 435. Because the IoT application server can execute using open-standards based APIs, this can simplify the core network architecture that could in turn result in significant CapEx/OpEx savings to the service providers.

The RAN Controller, executing the RAN Controller CEF MO Client 430, can consider scheduling of heterogeneous data transfers for IoT devices that result from a combination of actions including internal job executions, collection of IoT devices context data files, and services concurrently being offered. With an optimized work flow of the ORM, the RAN Controller CEF MO Client 430 can create an internal mapping of various objects to resources using the contextual data of targeted IoT devices in a given RAN Controller, and across several RAN Controllers operating in pooled regions. The logical partitioning of various resource user groups and objects per resource group could be based on operator design requirements. Such contextual mapping information can be exchanged with the context exposure function servers (e.g., CIES CEF MO Server 415) that can in turn process the raw data and create rules-based intelligence reports. These reports can be shared with external IoT service providers, based on service level agreements, to take proactive actions on the processed contextual data feeds. Thus, the RAN Controller CEF MO Client 430 can leverage efficient control plane routing methods to securely expose classified IoT objects/resources via suitable APIs to external IoT service providers (e.g., flexibly expose IoT device-specific contextual information that is required by the service providers on-demand in a timely manner). Further, the objects to resource user groups mapping (number of groups, objects per group, type of groups) within the MME can be flexible and operator configurable based on a combination of IMSI, device categories, priorities etc. Data objects extracted from MME could be used to derive additional intelligence required by their respective service providers to monitor, track and optimize their communications capabilities.

Referring back to the CIM 410, the CIM 410, based on the triggers received from the CIES Agent MO Client 420, can send context requests to the CIES CEF MO Server 415, which the context requests to the targeted RAN Controllers (e.g., MMEs/AMFs), more specifically the RAN Controller CEF MO Clients 430$_{1-N}$. Such triggers could be selectively sent to a single or multiple RAN controllers within the serving RAN controller pool region and across multiple pool regions based on the operator's deployment model (explained further below with respect to FIGS. 6 and 7). The RAN controllers 425$_{1-N}$ respond back to the CIES CEF MO Server 415 with their ORM data, which can then be sent to the CIM 410 for further processing, en-route to the CIES Agent MO Client 405, which can then forward the ORM data to the targeted application server (e.g., IoT application server 205).

Operationally, still referring to FIG. 4, the CIES 405 can receive a request from an IoT application server (e.g., IoT application server 205) for availability information associated with a response period in which an IoT device (IoT UE 305) is responsive to communications (e.g., when will a particular IoT device served by the IoT application server be active to receive communications from the IoT application server). In some example embodiments, the CIES 405 can send a status query related to the IoT device to a plurality of RAN controllers (RAN controllers 425$_{1-N}$). The RAN controller that has the IoT device registered with it might have stored within a device context repository 440 data regarding when the "wake up" time of the IoT device is. If it has the information, the RAN controller will send that information back to the CIES 405, which can then transmit a reachability notification to the IoT application server 205, informing it as to when the IoT device will be active and able to respond to communications directed toward it. When the time the IoT device is active arrives, the IoT application server 205 can transmit a message to the IoT device to obtain data during the response period.

Still referring to FIG. 4, in example embodiments, the CIES receives a device reachability request from an IoT application server (IoT application server 205 (e.g., seeking ORM data regarding when an IoT UE (IoT UE 305) will be active and can respond to communications. The IoT application server sends the device reachability request to the to the CIES Agent MO Client 420 with a device ID (identifying the IoT UE for which the IoT application server is requesting the ORM data) using Managed Object (MO) RESTful API.

At transaction (2), the CIES Agent MO Client 420 transmits a query to RAN controllers (with the device ID), invoking the CIM 410 to contact RAN controllers 425$_{1-N}$ and query them for device context.

In response, the CIM at transaction (3) sends a context request to the CIES CEF MO Server asking it to send context requests to all RAN Controller 425$_{1-N}$.

In response, the CIES CEF MO server 415 at transaction (4) sends device context requests to RAN Controllers 425$_{1-N}$.

At transaction (5) the RAN controllers 425$_{1-N}$ can respond by either sending a message with device context to CIES using the RAN Controller CEF MO client 430 with the context, if the RAN controller is the appropriate one with the information, or return a message indicating that it does not have the device context associated with the IoT UE. The device context (e.g., with the wake-up time of the IoT UE) can be retrieved from a device context repository 440$_{1-N}$.

Once the device context is received, the CIM 410 parses device context and applies additional intelligence (including pattern of awake intervals, etc.) to the device context received from the RAN controllers.

At transaction (7) the CIES Agent MO Client 420 sends the "wake time" associated with the IoT UE to the IoT application server, if the IoT UE was found. Otherwise, informs the IoT application server that the device was not found (e.g. device not in use).

In other example embodiments, the CIM 410 can at transaction (8) optionally set a count-down timer based on the wake time, with a callback to the MO client when time elapses and the wake time arrives. When the wake time arrives, at transaction (9) a notification (e.g., reachability notification) can be sent to the IoT application server.

The IoT application server can send a message to IoT device based on the received wake time, or upon receiving a reachability notification indicating that the IoT UE is active.

Figure 5:
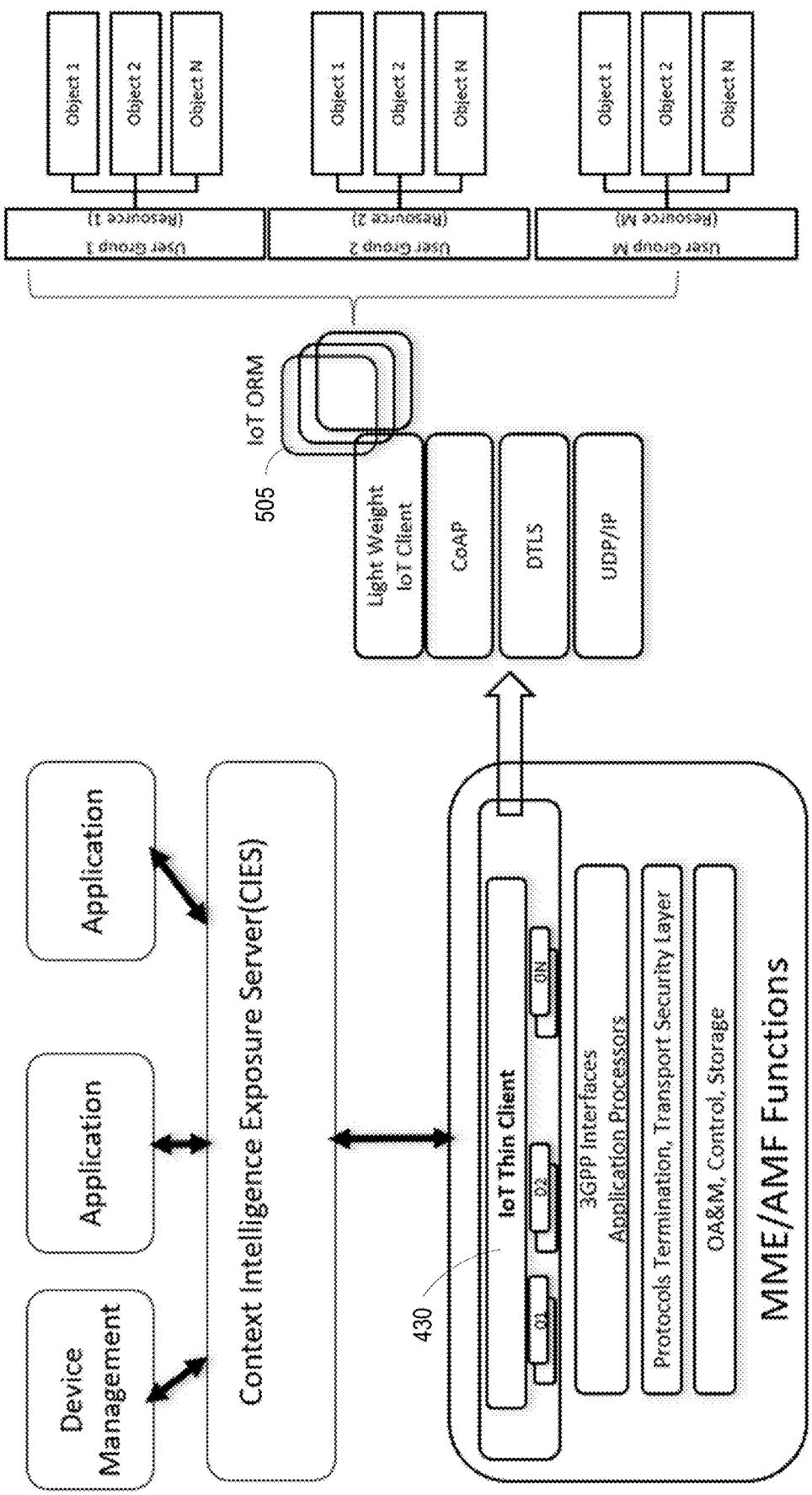
FIG. 5 illustrates a block diagram depicting a RAN controller context exposure function (CEF) managed object (MO) client, in accordance with various aspects and example embodiments of the subject application.

Moving on to FIG. 5, the RAN Controller CEF MO Client 430 can be implemented as a thin client in the RAN Controller (e.g., MME in LTE, or AMF in 5G). IoT ORM data 505, can comprise multiple data objects. Object 1, Object 2 . . . Object N. Object 1 can the device category, Object 2 can be related to sleep times, object N can relate to how much data the IoT UEs have to send, etc. There can also be an aggregation or resource manager for each user group (e.g., user group 1, user group 2, etc.). Hundreds of devices can fall under one resource group.

Figure 6:
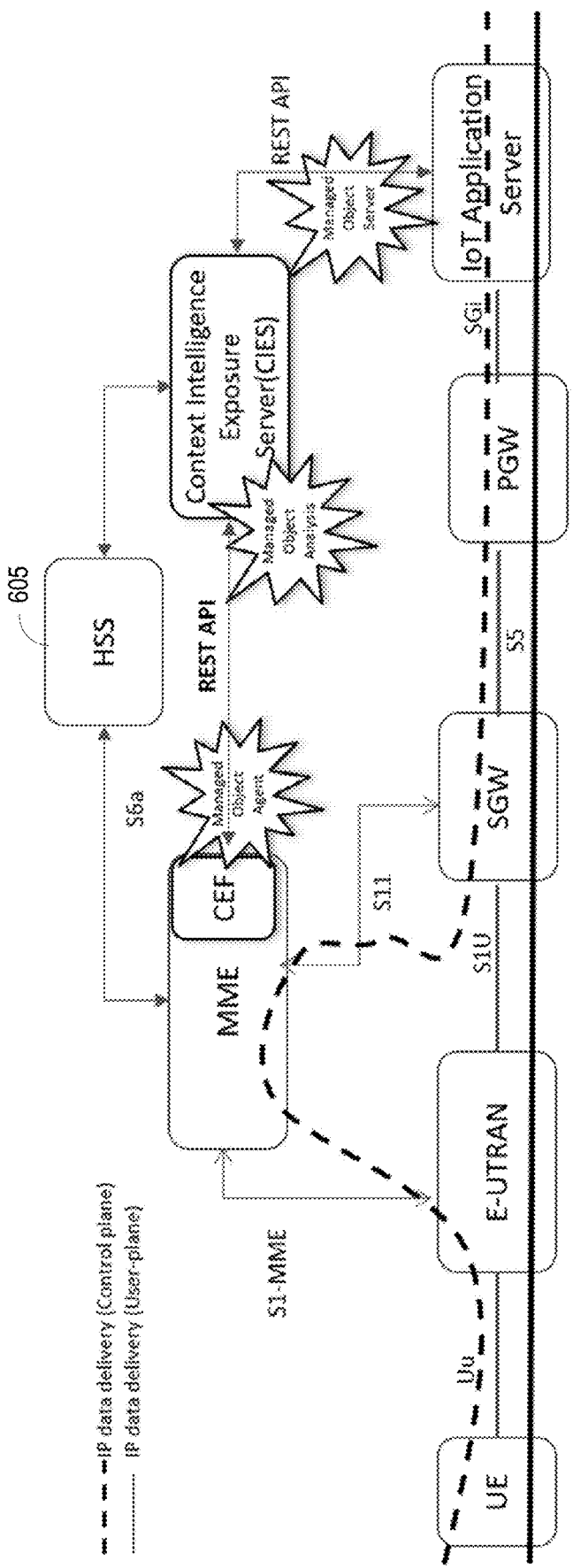
FIG. 6 illustrates an example LTE architecture for the delivery of IoT services facilitated by the CIES, CEF, and home subscriber system (HSS) components, in accordance with various aspects and example embodiments of the subject application.

Referring now to FIG. 6, the CIES 405 (e.g., CIES can determine exactly which Ran Controller (e.g., MME in LTE) is connected to each IoT UE (including the IoT UE from which an IoT application server seeks information (e.g., wake up time of the IoT UE). In example embodiments, the CIES 405 can contact a home subscriber system (HSS), HSS 705, and query "which MME is serving this device?" Once the information has been obtained from the HSS as to which MME is serving the IoT UE, and the CIES 405 can then send the device context request to the specific MME serving the IoT UE. It does not have to send it to a plurality of MMEs.

Figure 7:
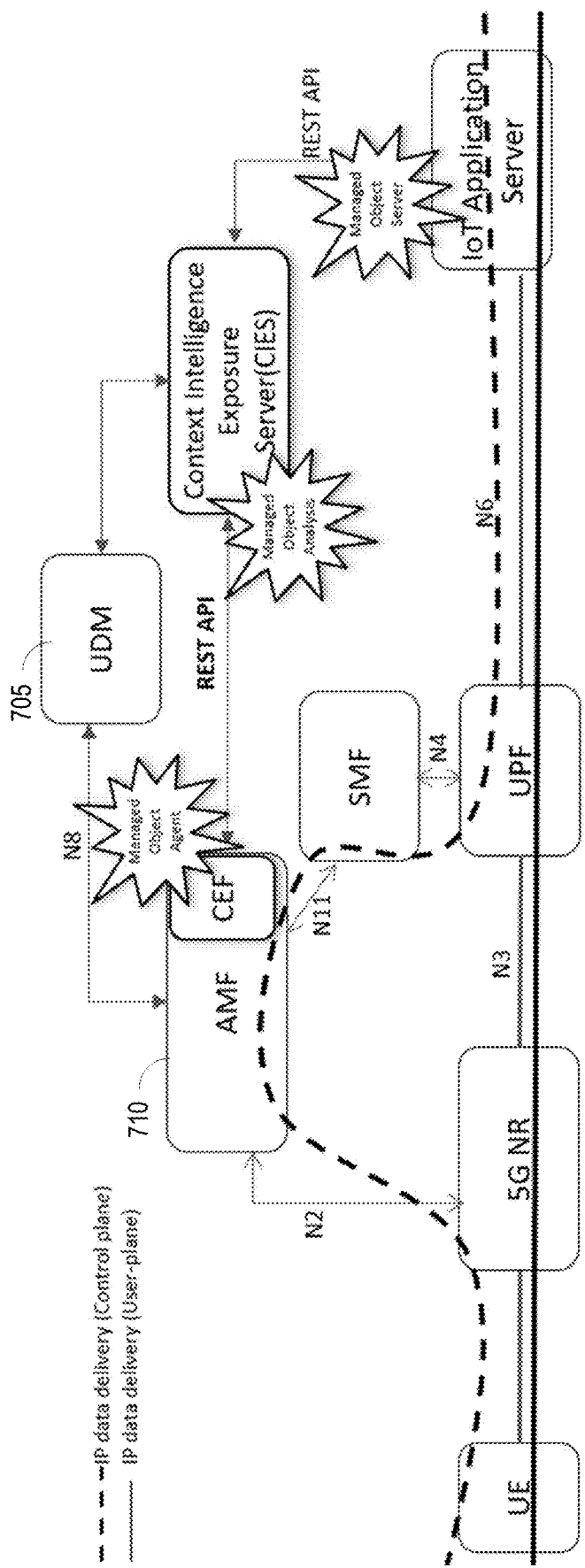
FIG. 7 illustrates an example illustrates an example 5G architecture for the delivery of IoT services facilitated by the CIES, CEF, and Unified Data Management (UDM) components, in accordance with various aspects and example embodiments of the subject application, in accordance with various aspects and example embodiments of the subject application.

Referring now to FIG. 7, in the 5G network, the unified data management UDM (UDM 705) serves the same function as the HSS. The UDM will know which RAN Controller (e.g., AMF 710 in 5G) is serving the IoT UE in question. All the 5G IoT devices are provisioned within this UDM.

In each of the example operations described above, and below in FIGS. 8-10, steps, blocks, features, or aspects can be substituted or combined with other steps, blocks, features, or aspects, unless context warrants that such combinations or substitutions are not possible. Further, if a step, block, feature, or aspect is not described with respect to example operations, this does not mean that the feature, step, or aspect is incompatible or impossible with respect to those example operations. As such, the example operations of the present application described above and below are not necessarily limited to the steps, features, or aspects that are described with respect to those example operations.

Figure 8:
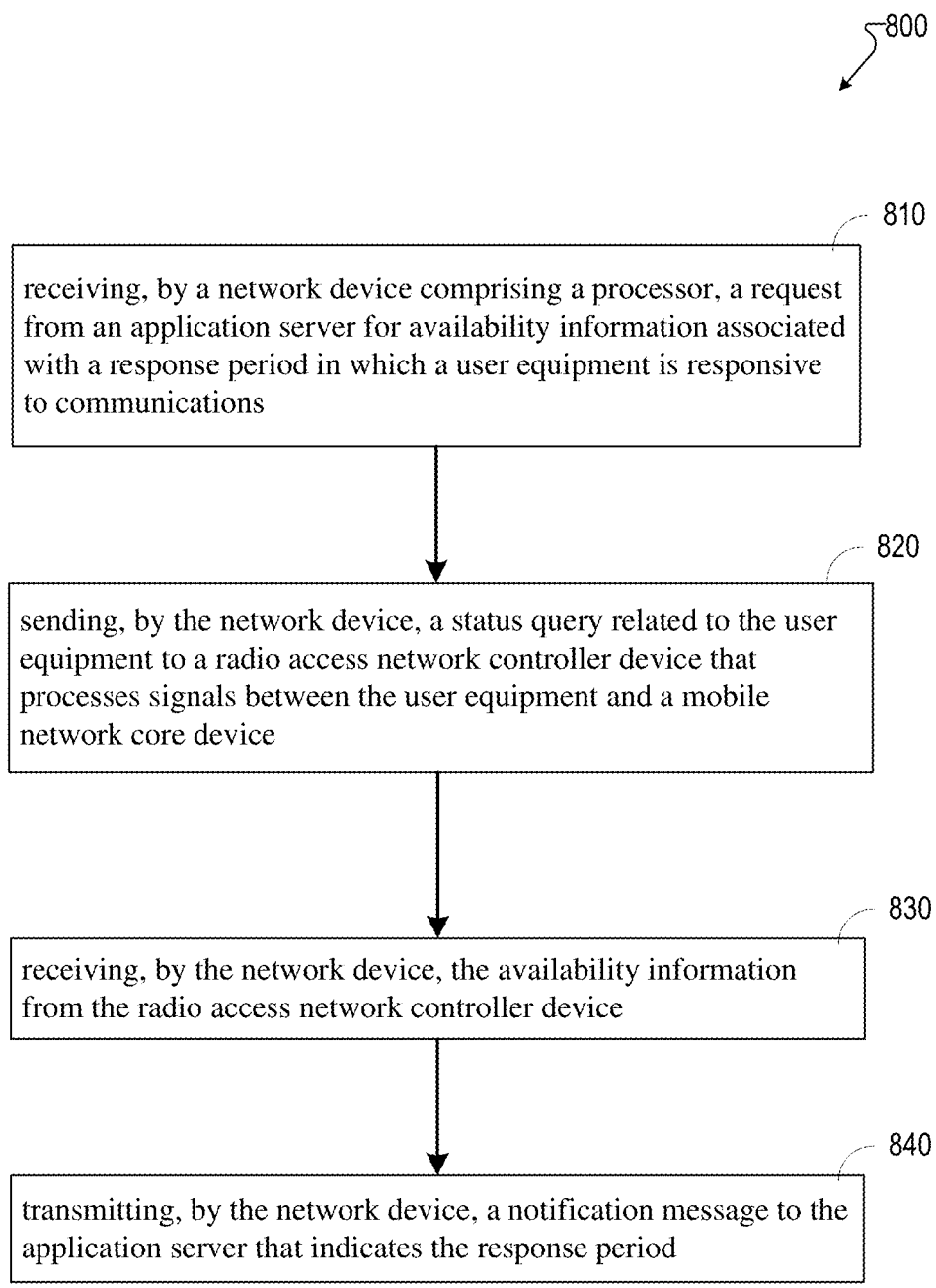
FIG. 8 is an illustration of example operations that can be performed by the CIES to facilitate IoT services, in accordance with various aspects and example embodiments of the subject application.

FIG. 8 depicts example operations 800 that can be performed by a network device (e.g., CIES 405) comprising a processor and a memory that stores executable instructions that, when executed by the processor, facilitate performance of example operations 800. The example operations at block 810 can comprise receiving, by the network device comprising a processor, a request from an application server (e.g., IoT application server 205) for availability information associated with a response period in which a user equipment is responsive to communications. The user equipment can be an IoT device (e.g., IoT UE 305). The internet of things device can comprise a device that monitors a usage of a utility service (e.g., water meter, electric meter, etc.) and communicates with the application server. The user equipment operates in different power modes. The different power modes can comprise an active state mode and an idle state mode. The user equipment, while in the idle state (inactive state) mode, consumes less power than the user equipment does while in the active state mode. While in the idle state mode, the user equipment might be unresponsive to the communications.

At block 820, the example operations 800 can comprise sending, by the network device, a status query related to the user equipment to a radio access network controller device that processes signals between the user equipment and a mobile network core device (network node 104, E-UTRAN 340, SGW 335, SCEF 315, etc.). The radio access network controller device can comprise a management mobility entity device (MME 320) that operates according to a long term evolution (LTE) mobile network protocol. The radio access network controller device can comprise an access and mobility management function device (AMF 710) that operates according to a fifth generation mobile network protocol (5G mobile network protocol). Prior to sending the status query to the radio access network controller, the network device can query a user equipment registration repository to determine the radio access network controller device that serves the user equipment. The user equipment registration repository can comprise a home subscriber system database (e.g., HSS 605) relating to user equipment registrations in a long term evolution (LTE) mobile network. The user equipment repository can comprise a unified data management database (UDM 705) associated with user equipment registrations in a fifth generation (5G) mobile network.

The radio access network controller, after receiving the status query, can determine a presence of the availability information in a repository accessible by the radio access network controller device, and retrieve the availability information (if it is found). In response to an absence of the availability information, the radio access network controller device can send a signal to the user equipment requesting the availability information (e.g., when the IoT UE reaches an active state again).

The example operations 800 at block 830 can comprise receiving, by the network device, the availability information from the radio access network controller device.

At block 840, the example operations 800 can comprise transmitting, by the network device, a notification message to the application server that indicates the response period. The application server transmits a message to the user equipment to obtain data during the response period based on receipt of the notification message.

Figure 9:
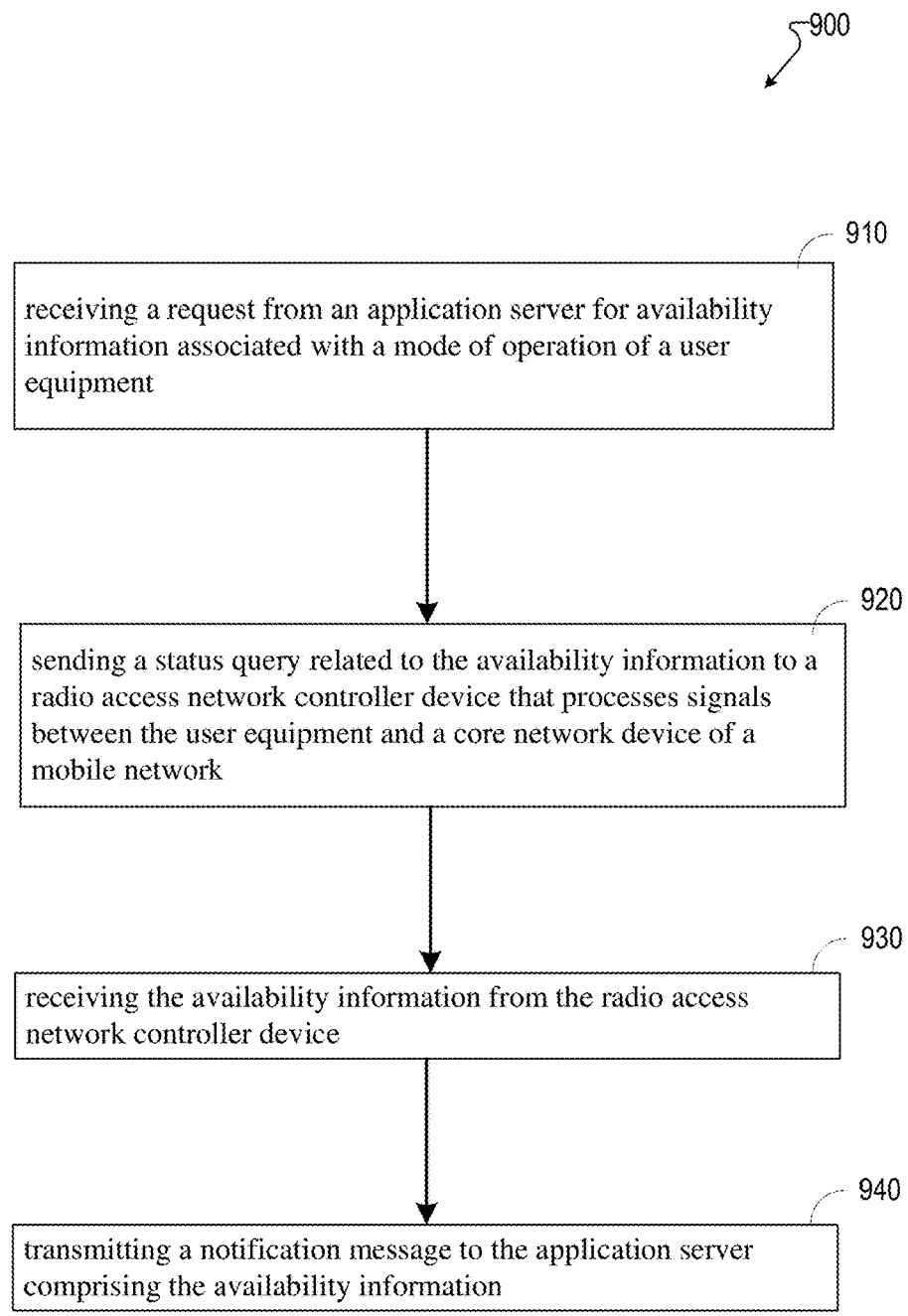
FIG. 9 is an illustration of another example of operations that can be performed by the CIES to facilitate IoT services, in accordance with various aspects and example embodiments of the subject application.

FIG. 9 depicts example operations 900 that can be performed by a network device (e.g., CIES 405) comprising a processor and a memory that stores executable instructions that, when executed by the processor, facilitate performance of example operations 900. The example operations 900 at block 910 can comprise receiving a request from an application server (e.g., IoT application serve 205) for availability information associated with a mode of operation of a user equipment. The user equipment can comprise an internet of things device (e.g., IoT UE 305) that provides data to the application server in response to a signal from the application server requesting the data. The mode of operation can comprise an active state in which the user equipment is responsive to communications. The mode of operation can comprise an inactive state (e.g., idle state) in which the user equipment consumes less power than when in an active state, and is unresponsive to communications.

The example operations 900 at block 920 can further comprise sending a status query related to the availability information to a radio access network controller device (e.g., MME 320, AMF 710) that processes signals between the user equipment and a core network device of a mobile network. In some example embodiments, sending the status query can comprise transmitting a broadcast signal received by the radio access network controller device, as well as other radio access network controller devices. In other example embodiments, the network device can first query a user equipment registration repository (e.g., HSS 605, UDM 705) to determine the radio access network controller device that serves the user equipment.

At block 930, the example operations 900 can comprise receiving the availability information from the radio access network controller device.

The example operations 900 at 940 can comprise transmitting a notification message to the application server comprising the availability information.

Figure 10:
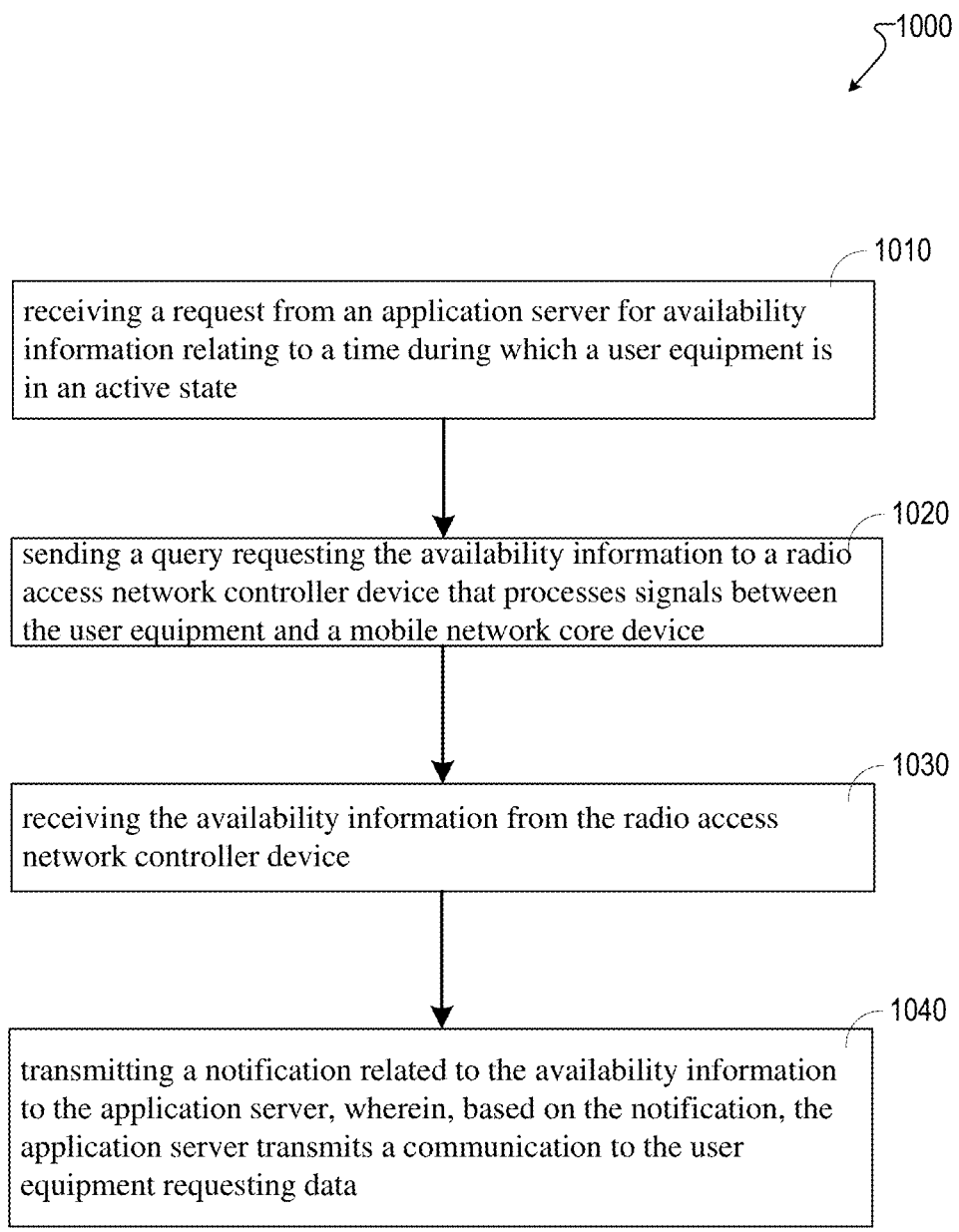
FIG. 10 is an illustration of another example of operations that can be performed by the CIES to facilitate IoT services, in accordance with various aspects and example embodiments of the subject application.

Now moving to FIG. 10, FIG. 10 illustrates another diagram depicting example operations 1000 that can be performed by a network device (CIES 405).

The example operations 1000 can comprise at block 1010 receiving a request from an application server (e.g., IoT application server 205) for availability information relating to a time during which a user equipment (e.g., IoT UE 305) is in an active state. The user equipment can comprise an internet of things device (e.g., IoT UE 305) that provides data to the application server in response to a signal from the application server requesting the data. The mode of operation of the user equipment can comprise an active state in which the user equipment is responsive to communications. The mode of operation can comprise an inactive state (e.g., idle state) in which the user equipment consumes less power than when in an active state, and is unresponsive to communications.

At block 1020, the example operations 1000 can further comprise sending a query requesting the availability information to a radio access network controller device (e.g., MME 320, AMF 710) that processes signals between the user equipment and a mobile network core device.

At block 1030, the example operations 1000 can comprise receiving the availability information from the radio access network controller device.

The example operations 1000 at 1040 can comprise transmitting a notification related to the availability information to the application server, wherein, based on the notification, the application server transmits a communication to the user equipment requesting data. In example embodiments, the transmitting the notification can further comprise, prior to transmitting the notification, determining the time during which the user equipment is in an active state based on the availability information. The operations can further comprise, transmitting the notification, at the time, to the application server.

Figure 11:
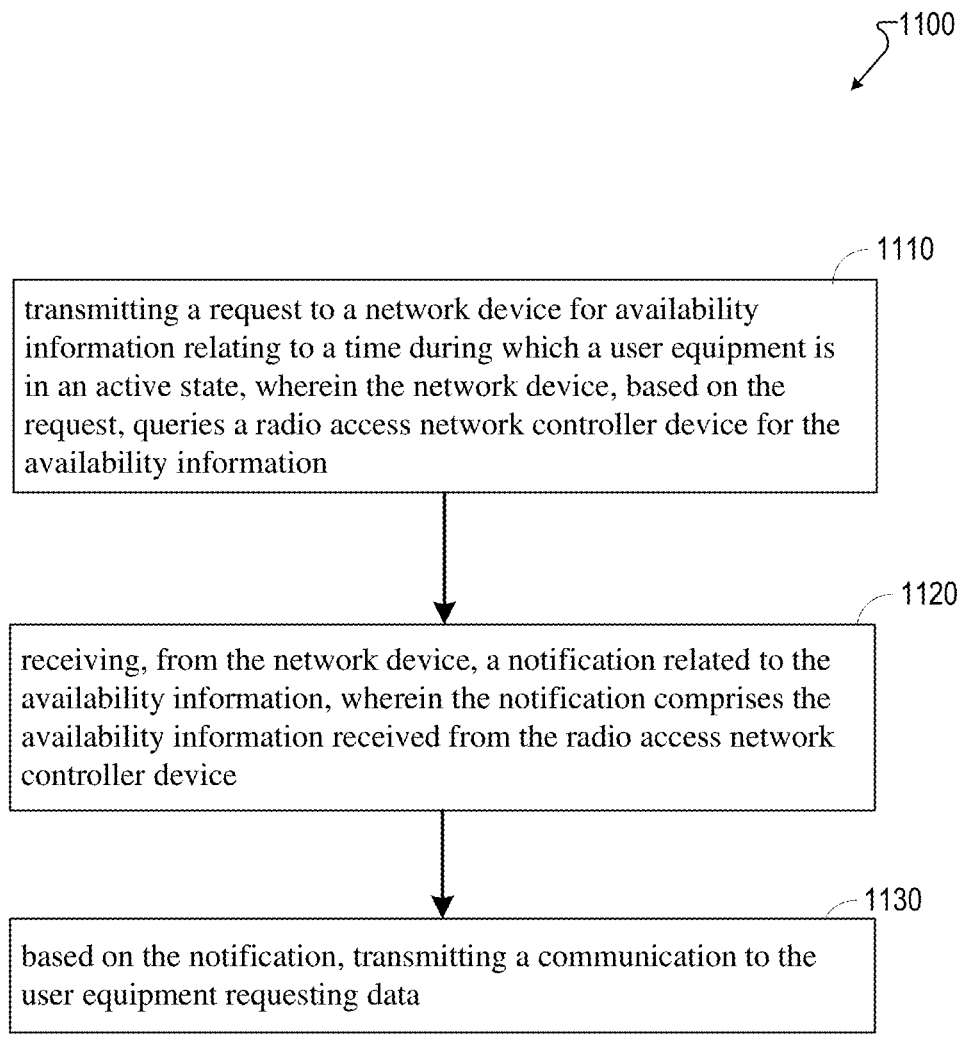
FIG. 11 is an illustration of example of operations that can be performed by an IoT application server, in accordance with various aspects and example embodiments of the subject application.

FIG. 11 comprises example operations 1100 that can be performed by an application server (e.g., IoT application server 205 comprising IoT application server CIES Agent MO Server 435) comprising a processor and memory.

At block 1110, the example operations 1100 can comprise transmitting a request to a network device (e.g., CIES 405) for availability information relating to a time during which a user equipment (e.g., IoT UE 305) is in an active state, wherein the network device, based on the request, queries a radio access network controller device (e.g., MME 320, AMF 710) for the availability information. The radio access network controller device can process signals between the user equipment and a core network device of a mobile network. In some example embodiments, querying the radio access network controller, by the network device, can comprise transmitting a broadcast signal received by the radio access network controller device, as well as other radio access network controller devices. In other example embodiments, the network device can first query a user equipment registration repository (e.g., HSS 605, UDM 705) to determine the radio access network controller device that serves the user equipment.

At block 1120, the example operations 1100 can comprise receiving, from the network device, a notification related to the availability information, wherein the notification can comprise the availability information received from the radio access network controller device. In example embodiments, the prior to receiving the notification, the network device can determine a time during which the user equipment is in an active state, in which the user equipment is responsive to communications, based on the availability information. The operations can further comprise receiving the notification, at the time, from the network device.

At block 1130, the example operations 1100 can comprise, based on the notification, transmitting a communication to the user equipment requesting data.

Figure 12:
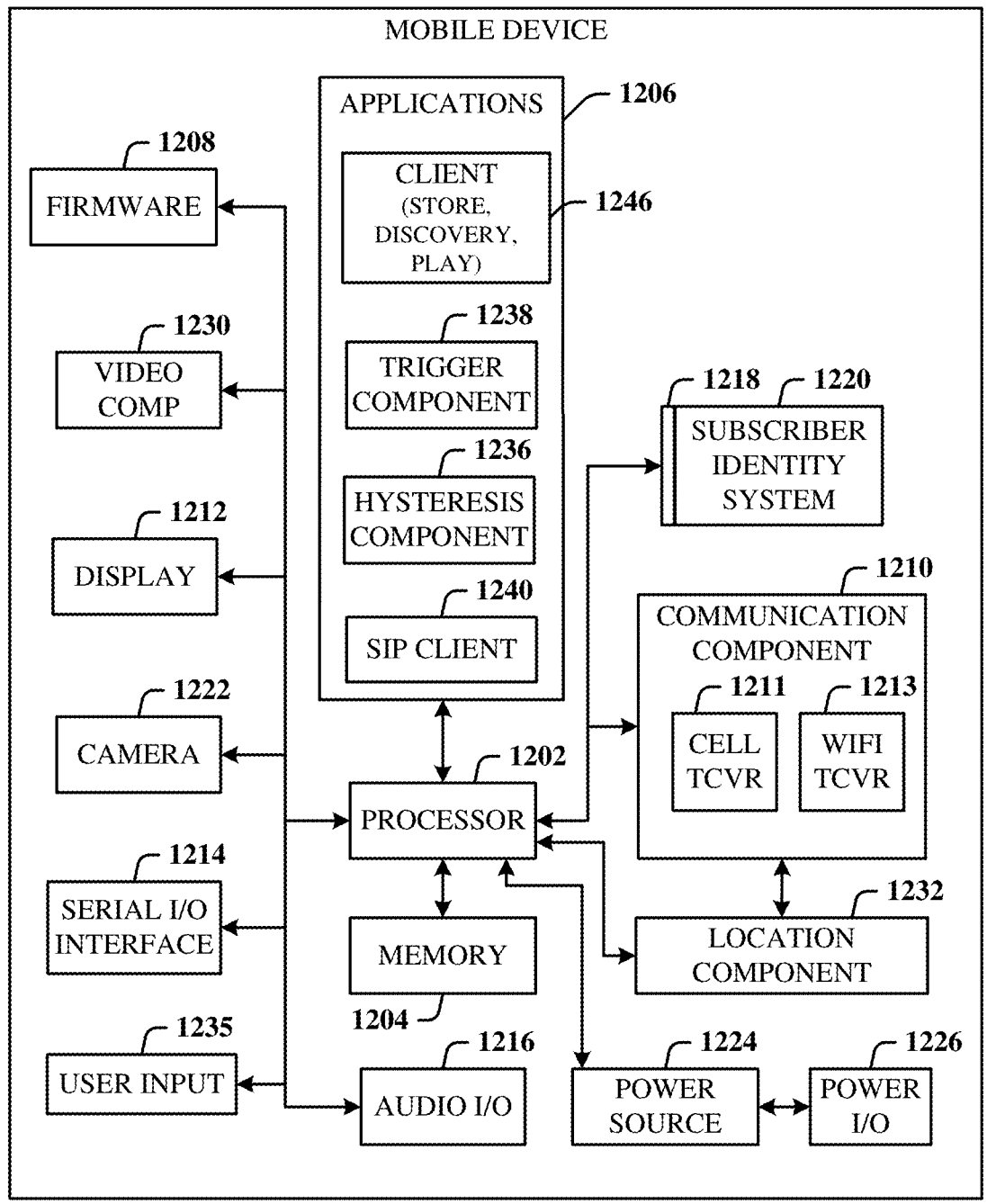
FIG. 12 illustrates an example block diagram of a mobile device that can be operable to communicate with a mobile network, in accordance with various aspects and embodiments of the subject application.

Referring now to FIG. 12, illustrated is a schematic block diagram of a mobile device 1200 (e.g., IoT UE 305) capable of connecting to a network in accordance with some embodiments described herein. Although a mobile device 1200 is illustrated herein, it will be understood that the mobile device can be other devices as well, and that the mobile device 1200 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The mobile device 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the mobile device 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a global GSM transceiver) and/or an unlicensed transceiver 1213 (e.g., Wi-Fi, WiMax) for corresponding signal communications. The mobile device 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The mobile device 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the mobile device 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The mobile device 1200 can include a slot interface 1218 for accommodating a SIC (Subscriber Identity Component)

in the form factor of a card Subscriber Identity Module (SIM) or universal SIM 1220, and interfacing the SIM card 1220 with the processor 1202. However, it is to be appreciated that the SIM card 1220 can be manufactured into the mobile device 1200, and updated by downloading data and software.

The mobile device 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the mobile device 1200 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The mobile device 1200 also includes a power source 1224 in the form of batteries and/or an AC power subsystem, which power source 1224 can interface to an external power system or charging equipment (not shown) by a power I/O component 1226.

The mobile device 1200 can also include a video component 1230 for processing video content received and, for recording and transmitting video content. For example, the video component 1230 can facilitate the generation, editing and sharing of video quotes. A location tracking component 1232 facilitates geographically locating the mobile device 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the mobile device 1200 to support SIP protocols and register the subscriber with the SIP registrar server. The applications 1206 can also include a client 1242 that provides at least the capability of discovery, play and store of multimedia content, for example, music.

The mobile device 1200, as indicated above related to the communications component 1210, includes an indoor network radio transceiver 1213 (e.g., Wi-Fi transceiver 1213). This function supports the indoor radio link, such as IEEE 802.11, for the mobile device 1200. The mobile device 1200 can accommodate at least satellite radio services through a handset that can combine wireless voice and digital radio chipsets into a single handheld device.

Figure 13:
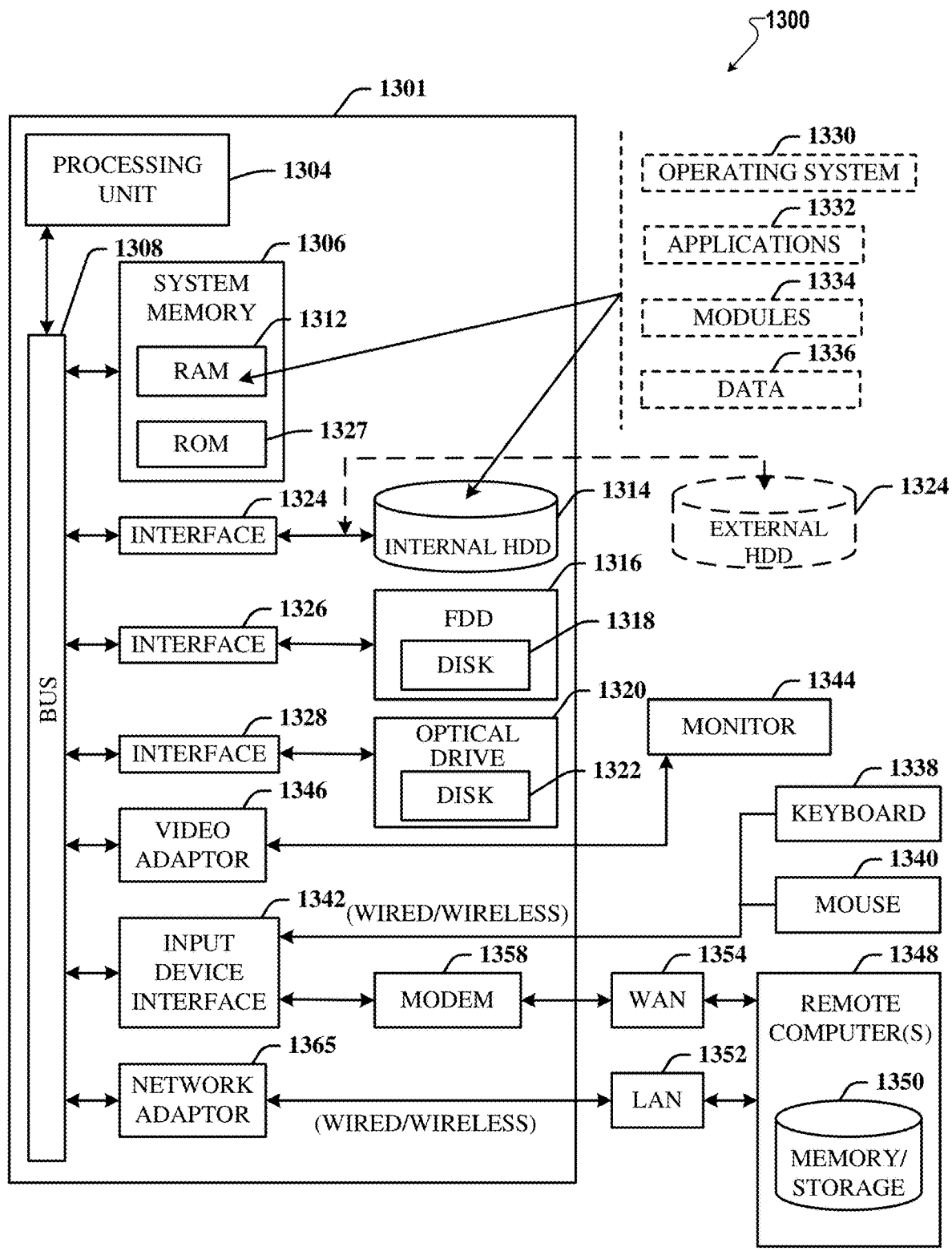
FIG. 13 illustrates an example block diagram of a computer that can be operable to execute processes and methods, in accordance with various aspects and embodiments of the subject application.

Referring now to FIG. 13, there is illustrated a block diagram of a computer 1300 operable to execute the functions and operations performed in the described example embodiments. For example, MME 320, AMF 710, CIES 405, IoT application server 205, can contain components as described in FIG. 13. The computer 1300 can provide networking and communication capabilities between a wired or wireless communication network and a server and/or communication device. In order to provide additional context for various aspects thereof, FIG. 13 and the following discussion are intended to provide a brief, general description of a suitable computing environment in which the various aspects of the embodiments can be implemented to facilitate the functions and operations described herein. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein, devices can include a computer 1300, the computer 1300 comprising a processing unit 1304, a system memory 1306 and a system bus 1308. The system bus 1308 couples system components comprising the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 comprises read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further comprises an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1312, comprising an operating system 1330, one or more application programs 1332, other program modules 1334 and program data 1336. All or portions of the operating system, applications, modules, and/or data can also be cached in the RAM 1312. It is to be appreciated that the embodiments can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically comprises other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1300 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   receiving, by context exposure equipment comprising a processor, a request from application server equipment for availability information corresponding to a response period comprising a period of time in which a user equipment is active to receive communications;
   sending, by the context exposure equipment, a status query related to the availability information to radio access network controller equipment that processes signals between the user equipment and mobile network core equipment, wherein the radio access network controller equipment accesses access mobility management entity functions;
   receiving, by the context exposure equipment, the availability information from the radio access network controller equipment, wherein the availability information comprises an exposed context of the user equipment; and
   based on the availability information, to facilitate a connection between the application server equipment and the user equipment, transmitting, by the context exposure equipment, a notification message to the application server equipment that indicates the response period, wherein the user equipment comprises an internet of things device.

2. The method of claim 1, wherein the application server equipment transmits a message to the user equipment to obtain data during the response period based on receipt of the notification message.

3. The method of claim 1, wherein the radio access network controller equipment comprises management mobility entity equipment that operates according to a long term evolution mobile network protocol.

4. The method of claim 1, wherein the radio access network controller equipment comprises access and mobility management function equipment that operates according to a fifth generation mobile network protocol.

5. The method of claim 1, further comprising, prior to the sending, querying, by the context exposure equipment, a user equipment registration repository to determine the radio access network controller equipment that serves the user equipment.

6. The method of claim 1, wherein the radio access network controller equipment determines a presence of the availability information in a repository accessible by the radio access network controller equipment.

7. The method of claim 6, wherein, in response to an absence of the availability information, the radio access network controller equipment sends a signal to the user equipment requesting the availability information.

8. The method of claim 1, wherein the user equipment monitors a usage of a utility service and communicates with the application server equipment.

9. The method of claim 1, wherein the user equipment operates in different power modes.

10. The method of claim 9, wherein the different power modes comprise an active state mode and an idle state mode.

11. The method of claim 10, wherein the user equipment, while in the idle state mode, consumes less power than the user equipment does while in the active state mode.

12. The method of claim 10, wherein the exposed context comprises a scheduled time for the user equipment to transition from the idle state mode to the active state mode.

13. The method of claim 11, wherein the user equipment, while in the idle state mode, is not active to receive the communications.

14. A context exposure system, comprising:
a processor; and
a memory that stores executable instructions that, when executed by the processor, facilitate performance of operations, comprising:
receiving a request from application server equipment for availability information comprising a period of time in which a user equipment is active to receive communications;
sending a status query related to the availability information to radio access network controller equipment that processes signals between the user equipment and core network equipment, wherein the radio access network controller equipment accesses access mobility management entity functions;
receiving the availability information from the radio access network controller equipment, wherein the availability information comprises an exposed context of the user equipment; and
based on the availability information, to facilitate a connection between the application server equipment and the user equipment, transmitting a notification message to the application server equipment comprising the availability information, wherein the user equipment comprises an internet of things device.

15. The context exposure system of claim 14, wherein the sending of the status query further comprises transmitting a broadcast signal received by the radio access network controller equipment.

16. The context exposure system of claim 14, wherein the period of time in which the user equipment is active to receive communications comprises the period of time in which the user equipment is active to receive communications from the application server equipment.

17. The context exposure system of claim 14, wherein the user equipment comprises an internet of things device that provides data to the application server equipment in response to a signal from the application server equipment requesting the data.

18. A non-transitory machine-readable medium, comprising executable instructions that, when executed by a processor of context exposure equipment, facilitate performance of operations, comprising:
receiving a request from application server equipment for availability information relating to a period of time during which a user equipment is in an active state to receive communications;
sending a query requesting the availability information to radio access network controller equipment that processes signals between the user equipment and mobile network core equipment, wherein the radio access network controller equipment accesses access mobility management entity functions;
receiving the availability information from the radio access network controller, wherein the context exposure equipment comprises a context intelligence exposure server that, based on the availability information, enables a connection between the radio access network controller equipment and the user equipment; and
based on the availability information, transmitting a notification related to the availability information to the application server equipment, wherein, based on the notification, the application server equipment transmits a communication to the user equipment, wherein the user equipment comprises an internet of things device.

19. The non-transitory machine-readable medium of claim 18, wherein the operations further comprise, prior to the sending, querying a user equipment registration repository to determine the radio access network controller equipment that serves the user equipment.

20. The non-transitory machine-readable medium of claim 18, wherein the transmitting the notification comprises:
prior to the transmitting the notification, determining the period of time based on the availability information; and
transmitting the notification, during the period of time, to the application server equipment.

* * * * *